UNITED STATES PATENT OFFICE.

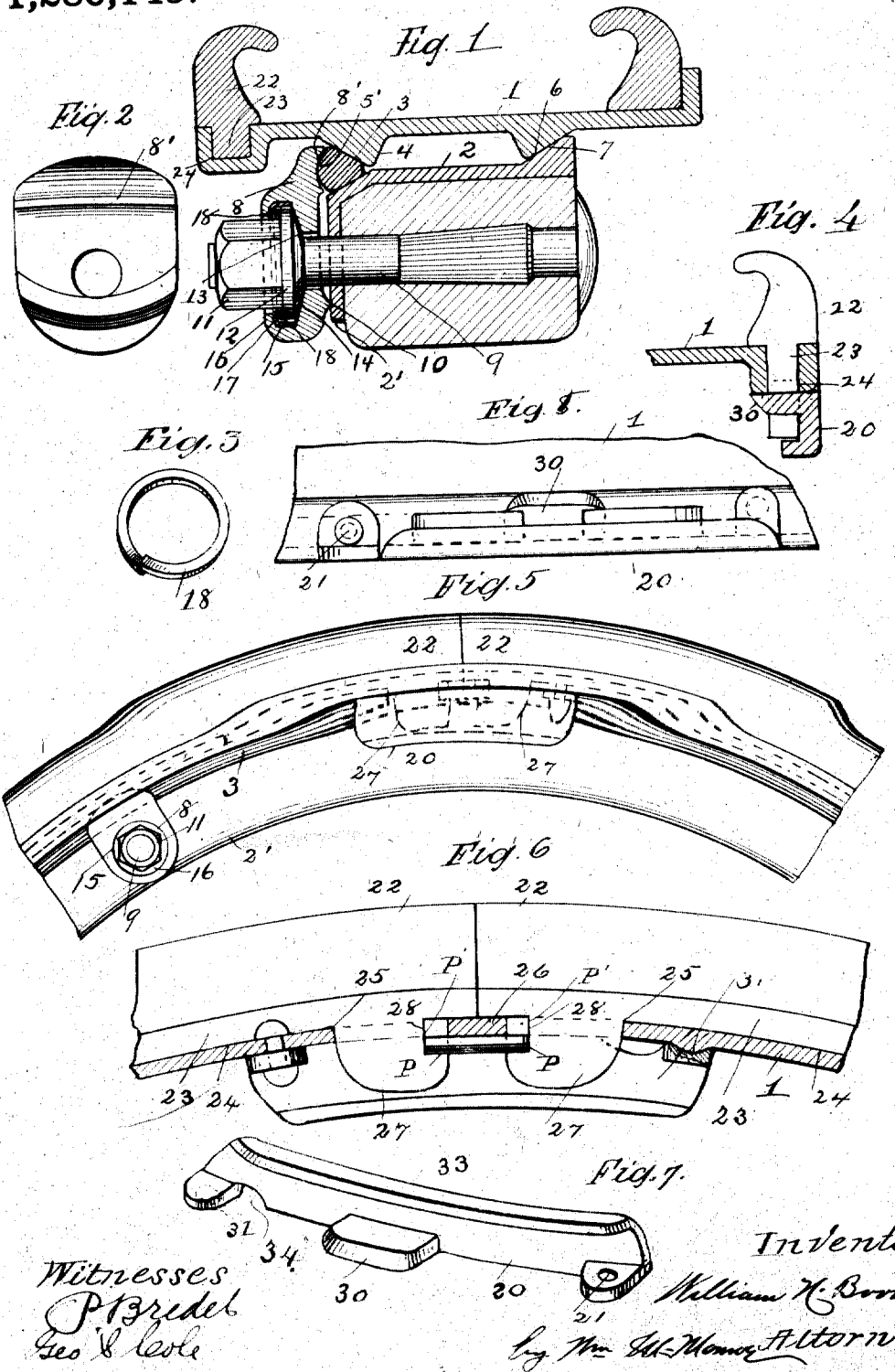

WILLIAM N. BOOTH, OF DETROIT, MICHIGAN, ASSIGNOR TO KELSEY WHEEL COMPANY, INC., OF DETROIT, MICHIGAN, A CORPORATION OF NEW YORK.

DEMOUNTABLE RIM.

1,280,145.  Specification of Letters Patent.  Patented Oct. 1, 1918.

Application filed December 21, 1912, Serial No. 737,954. Renewed August 16, 1916. Serial No. 115,347.

*To all whom it may concern:*

Be it known that I, WILLIAM N. BOOTH, a citizen of the United States, and resident of Detroit, in the county of Wayne and State of Michigan, have invented certain new and useful Improvements in Demountable Rims, of which I hereby declare the following to be a full, clear, and exact description, such as will enable others skilled in the art to which it appertains to make and use the same.

The objects of the invention are to provide a device for securely attaching the demountable rim of a pneumatic tire to the felly rim and to provide a clamping means for the rim including a nut so mounted as to remain stationary when loosened in whatever position it may be put, and said clamping means also arranged to provide three points for engagement and so adapt itself to all inequalities of the engaging surfaces.

The invention also includes means for detachably securing a split tire holding ring for a clencher or other tire to the rim.

The invention is hereinafter further described, the various features illustrated in the accompanying drawings and specifically pointed out in the claims.

In the accompanying drawings Figure 1 is a transverse section through the demountable and felly rim of an automobile wheel showing the clamping device for the felly rim; Fig. 2 is a view of the inner surface of the clamping plate; Fig. 3 is a perspective view of a split ring employed to exert a pressure between the nut and clamping plate; Fig. 4 is a transverse section of the edge of the automobile rim showing the wedging clasp therefor; Fig. 5 is a side elevation of a portion of the complete rim showing the device for securing the rims together and also the clasp for securing the detachable ring to the demountable ring; Fig. 6 is an enlarged circumferential section showing the engagement of the clasp with the extremities of the detachable ring; Fig. 7 is a perspective view of the clasp detached from the rim. Fig. 8 is a plan view of the inner face of the demountable rim, showing the clasp or pivoted plate which holds the split ring in place.

In these views 1 is the automobile rim, 2 the felly rim having a downwardly turned flange upon its outer edge, 3 is a wedge shaped ring adapted to engage an annular wedge shaped projection 4 on the automobile rim and an inclined surface 5 on the felly rim, correspondingly inclined surfaces 6 and 7 on the opposite edge of the automobile and felly rims engaged as shown in Fig. 1 when the plates are drawn together.

The inclined surfaces 4 and 5 are shown at one side of the rim and the surfaces 6 and 7 at the other side.

The outer rim is sleeved over the inner rim, the wedge shaped ring is then put in place and clamping plates 8 through which pass holding bolts 9 secure these parts tightly together.

The surface of the clamping plate 8 which engages the wedge shaped ring is curved at 8' to correspond to the curvature of the ring and the ring is also outwardly curved on its outer surface at 5' so as to give a rolling engagement to the clamping surface, when the clamp rocks on the bolt which will adjust itself to slight variations in positions of the parts.

A second point of engagement is shown at 10 where the clamp rests against the downwardly turned outer face 2' of the felly rim. The nut 11 upon the bolt 9 is provided with the flange 12 and the nut is curved on its inner face at 13 to engage a correspondingly shaped recess 14 of the clamping plate thus permitting the rolling engagement of the clamp upon the wedge shaped ring mentioned and givin free rocking movement of the clamp upon the nut.

The clamping plate is deeply recessed at 15 and in this recess the flanged end of the nut is inserted and the edges of the recess are turned over at 16 to prevent the removal of the nut.

A curved washer 17 within the recess serves as a friction bearing for the nut and a split spring ring 18 inserted between the flange and the washer serves to permit rocking and longitudinal movements of the clamp upon the bolt, and will also retain the nut at any angle at which it may be placed so that it will not turn when the parts have been loosened and also will retain the clamp in its position, so that it will not fall down and will always be in position to be put into engagement with the ring ready to be again tightened. This is a great convenience in the use of an automobile and serves to prevent a great waste of time in restoring the clamps to place before they can be tightened up.

This clamping device is shown in Fig. 5 and also a clasp 20 is shown pivoted to the demountable rim at 21 in Fig. 8, which will secure the extremities of the split tire retaining ring as shown at 22 when brought together into their places.

In Figs. 4, 5, 6, and 7 this device is shown. Here the split ring 22 is shown provided with a tongue 23 inserted in the groove 24 in the demountable rim. Openings 25 are shown in this rim one on each side of an integral bar 26. Each extremity of the split ring 22 is provided with a projecting member 27 adapted to pass through one of the openings 25 and each projecting member 27 is cut away at 28 to form a shoulder portion P, and a neck portion P'.

The clasp or plate 20 is provided with the wedge shaped projection 30 adapted to pass underneath the member 26 and to press against the shoulders 28 and thus when the clasp is closed to force inward the projections 27 to close tightly the extremities of the split ring 22. To prevent the escape of the members 27 from their locked position, a recess 32 in the inner face of the clasp plate 20 engages a projection 31 upon the rim 1, and resilient engagement is made by means of the spring action of the clasp 20.

An overhanging edge 33 protects the parts from injury. An opening 34 is formed in one edge of the clasp 20 into which a tool can be inserted to release the clasp.

This device is important, since it is quickly operated, efficient and simple in construction, and by its means the tire holding ring can be rapidly attached and detached from the demountable rim.

As clearly shown in Fig. 1, the bearing 10 on the clamping plate 8 forms a fulcrum around which said plate swings as pressure is applied to it by tightening the nut 11. This swinging or angular movement is permitted without throwing any lateral stress upon the bolt 9, by reason of the loose fit between the nut and the plate and the curved or spherical bearing 13 on the inner face of the nut. Thus a universally pivoted swivel joint is formed, resolving the stresses into a longitudinal tension upon the bolt and converting the clamp into a lever of the third class.

Having described the invention what I claim as new and desire to secure by Letters Patent is:

1. In combination with a felly and felly rim, and demountable rim, said rims provided with correspondingly inclined surfaces on their meeting faces, and also with oppositely inclined faces, a wedge shaped ring adapted to engage said oppositely inclined faces, said ring having a curved projecting outer face, clamping plates having points of engagement with said felly rim, and each having a recessed face adapted to engage said wedge shaped ring, the engaging surfaces of clamps and rings permitting of free play on each other, bolts passing through each clamping plate and felly ring, and a nut for each bolt, said nut provided with a flange and having a rounded inner face, each clamping plate having a correspondingly curved recess, the outer walls of said recess curved over the edge of said flange to retain the same and a washer and spring ring in said recess.

2. The combination with the felly of a wheel having a band, a rim thereon, and a wedge ring for holding said rim in place, of clamping means comprising a bolt secured to said felly, a nut carried by said bolt, a clamp plate mounted for rocking movement on and carried by said nut and non-detachably held thereon, and a resilient member for normally holding the seat in the clamp plate against the working face of the nut.

3. The combination with the felly of a wheel having a band, a rim thereon, a wedge ring holding said rim in place and having a crowned outer face, of a clamp plate having a concave seat engaging said crowned face, a bolt passing through said felly, and the plate, and a nut loosely carried by said plate and non-detachably held therein.

4. The combination with a felly band provided with an inwardly extending flange at one edge, and a demountable rim thereon engaging said felly band at the opposite edge thereof, said felly band and demountable rim provided with reversely extending inclines on their edges adjacent to said inwardly extending flange of a wedge shaped ring adapted to engage said reversely extending inclines on said band and rim, clamps engaging said ring, and provided each with a heel fulcrumed upon said inwardly extending band, each of said clamps provided with a recess in its outer face, said recess having a concave inner face and inwardly turned outer edges, a bolt passing through each clamp and felly band, a nut upon each bolt and having a concave rear surface, each nut having an extended annular flange, a friction washer for said nut inclosed by the edge of said recess, and a spring inclosed between said washer and the flange upon said nut whereby said clamp is retained from turning when released from said ring.

5. In a clamping device for securing a demountable rim upon a felly band, said felly band having an inwardly turned flange, a bolt passing through said downwardly turned flange, a clamp having a heel engaging said flange and pivoting thereon, said clamp having a recess in its outer face, the outer edges of which incline inwardly, a flanged nut upon said bolt seated in said recess, a friction washer in said recess, and a spring located between said washer and flange.

6. In a clamping device for securing a demountable rim upon a felly band, the combination of a clamping plate and a nut having a universally pivoted swivel engagement therewith.

7. In a clamping device for securing a demountable rim upon a felly band, the combination with a securing bolt passing laterally through the felly, of a clamping-plate sleeved upon said bolt having a fulcrum bearing on one side thereof and a clamping bearing upon the opposite side, and a nut universally pivotally swiveled to said clamping-plate and engaging the threaded portion of said bolt.

8. In a clamping device for securing a demountable rim upon a felly band, the combination with a bolt projecting laterally from the felly, of a clamping-plate having a fulcrum bearing against said felly on the inner side of said bolt and a clamping bearing on the outer side thereof, and a nut universally pivotally swiveled to said clamping-plate and engaging the threaded portion of said bolt.

9. In a clamping device for securing a demountable rim upon a felly band, a bolt projecting laterally from the felly, a clamp having a fulcrum bearing at the inner side of said bolt and a clamping bearing upon the outer side thereof, the outer face of said clamp being recessed, a flanged nut universally pivotally swiveled in said recess, and a retaining flange on said clamp for permanently securing said nut, permitting a limited universal movement thereof.

In testimony whereof, I hereunto set my hand this 2nd day of November 1912.

WILLIAM N. BOOTH.

In presence of—
Geo. S. Cole,
Wm. M. Monroe.